United States Patent [19]
Clancy, III et al.

[11] Patent Number: 6,012,667
[45] Date of Patent: *Jan. 11, 2000

[54] MULTI-LEVEL LOAD LIMITING TORSION BAR RETRACTOR

[75] Inventors: Edward W. Clancy, III, Livonia; Gerald Keller, Shelby Township, Macomb County; H. John Miller, III, Macomb Township, Macomb County; William L. Palmer, Rochester; Susan A. Richards, Sterling Heights; Carl M. Petersen, III, Waterford; Brian Nadeau, Livonia, all of Mich.

[73] Assignee: Breed Automotive Technology Inc., Lakeland, Fla.

[*] Notice: This patent is subject to a terminal disclaimer.

[21] Appl. No.: 09/026,102

[22] Filed: Feb. 19, 1998

[51] Int. Cl.$^7$ .............................. B60R 22/28; B65H 75/48
[52] U.S. Cl. ........................................ 242/379.1; 280/805
[58] Field of Search .................................. 242/379.1, 384, 242/384.2; 280/805, 806, 807; 297/470, 471, 472

[56] References Cited

U.S. PATENT DOCUMENTS 5,785,269  7/1998  Miller, III et al. .................. 242/379.1
5,799,893  9/1998  Miller, III et al. .................. 242/379.1
5,820,058  10/1998  Hinzel et al. ........................ 242/379.1

*Primary Examiner*—John Q. Nguyen
*Attorney, Agent, or Firm*—Markell Seitzman

[57] ABSTRACT

An energy absorbing retractor having a frame, locking mechanisms to initially stop a spool from rotating in a belt protraction direction, the spool rotationally supported relative to the frame, a seat belt wound about the spool, and biasing device to retract the seat belt, a two-sided torsion bar for generating at least a first level of reaction torque on the spool permitting the spool to rotate in a controlled manner in a belt protracting direction including a torsion bar having a middle portion fixedly coupled to the spool to prevent relative rotation therebetween, a first torsion rod extending therefrom, the first torsion rod including a first end coupled to a first locking mechanism to prevent the first end from rotating upon such coupling, whereby upon locking of the first end, and the loading of the spool, the first torsion rod is twisted to generate a first level of control force. A second torsion rod including a second end coupled to a second locking mechanism to prevent the second end from rotating upon such coupling, whereby upon locking of the second end, and the loading of the spool, the first and second torsion rods are twisted simultaneously to generate a second level of control force.

12 Claims, 5 Drawing Sheets

MULTI-LEVEL LOAD LIMITING TORSION BAR RETRACTOR

This application is related to Ser. No. 08/796,426 filed Feb. 6, 1997 which issued Jul. 28, 1998, now U.S. Pat. No. 5,785,269 and application Ser. No. 08/801,234, filed Feb. 19, 1997, now U.S. Pat. No. 5,799,893, which issued Sep. 1, 1998.

BACKGROUND AND SUMMARY OF THE INVENTION

The present invention generally relates to seat belt retractors which include a means for absorbing or dissipating crash energy. More particularly, the present invention relates to a seat belt retractor having a multi-level reaction force generating torsion bar therein.

In a conventional seat belt retractor, a web or a vehicle (often called inertial) sensor is used to stop the rotation of a spool to prevent the protraction of the seat belt webbing during an accident. A second class of seat belt retractors permits the controlled protraction of the seat belt by incorporating within the retractor an energy absorption (or dissipation) mechanism which permits the spool to rotate after the retractor has been initially locked up. In the past these mechanisms have included crushable bushings (U.S. Pat. No. 5,547,143), deformable tubes (U.S. Pat. No. 3,881,667) or torsion bars (U.S. Pat. No. 3,741,494).

It is an object of the present invention to provide an energy absorbing retractor that has one or more load limiting levels, a retractor that may be activated either mechanically, electrically or pyrotechnically, and one which utilizes a unique energy absorbing (dissipating) mechanism.

Accordingly the invention comprises: an energy absorbing retractor having a frame, locking mechanisms to initially stop a spool from rotating in a belt protraction direction, the spool being rotationally supported relative to the frame, a seat belt wound about the spool, bias means to retract the seat belt, and torsion bar means for generating at least a first level of reaction torque on the spool permitting the spool to rotate in a controlled manner in a belt protracting direction including a torsion bar having a middle portion and a first torsion rod (or torque or torsion tube) extending therefrom, the middle portion fixedly coupled to the spool to prevent relative rotation therebetween, the first torsion rod including a first end coupled to first locking mechanisms to prevent the first end from rotating upon such coupling, whereby upon locking of the first end, and the loading of the spool, the first torsion rod is twisted, permitting the spool to rotate, to generate a first level of control force. A second torsion rod (or torque or torsion tube) is provided which can generate a second level of reaction force. A third level of reaction force is attainable if both torsion rods are activated relatively simultaneously.

Many other objects and purposes of the invention will be clear from the following detailed description of the drawings.

DETAILED DESCRIPTION OF THE DRAWINGS

Figure 2:
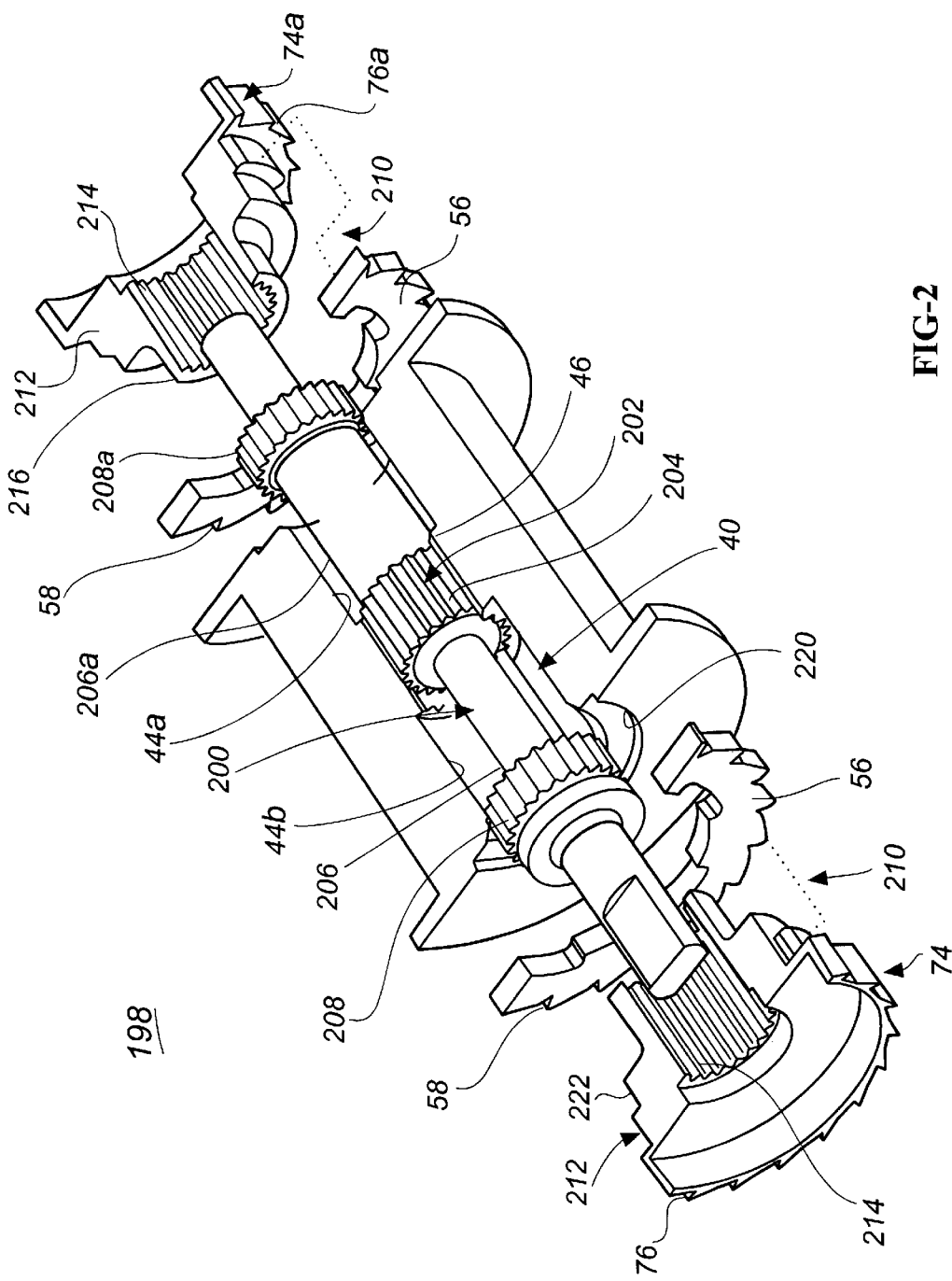
FIG. 2 is an isolated isometric view showing an axle assembly.

Reference is made to the drawings which show a cross-sectional view of a seat belt retractor 20 constructed in accordance with the present invention. The retractor includes a U-shaped frame 22 having frame sides 24a and 24b and a rear portion 24c. Part 24c includes a mounting opening 26. Each side 24a and b includes a respective circular opening 28a and 28b. Rotatably supported on the frame 22 is a spool generally shown as 30. The spool includes a center portion 32 and flanges 34a and 34b. A length of seat belt webbing 36 is wound upon the center part of the spool. An inner end of the seat belt is received within a slot 37 formed within the spool in a known manner. The spool 30 further includes a central, stepped through bore 40 having a narrow center section 42 and two opposing wider end sections 44a and 44b. The narrow section 42 includes internal teeth or splines 46 as are more clearly shown in FIG. 2.

Situated in the through bore 40 is an axle assembly 198 comprising a torsion bar assembly 200 having a center section 202 having splines 204 which mate with splines 46 of the through bore 40 to prevent the center section 202 of the torsion bar assembly from rotating relative to the spool 30. The torsion bar assembly includes a first extending torsion rod 206 which terminates in a splined section 208. The diameter of the splined section 208 is larger than the diameter of the torsion bar 206. Extending from the center section 202, opposite to rod 206, is a second torsion rod 206a which terminates in a splined section 208a. Either torsion rod 206 or 206a can be replaced by a torque or torsion tube 206' shown in phantom line. In the preferred embodiment of the invention the diameters of the torsion rod 206 and 206a are dissimilar, however the invention contemplates also using torsion rods or bars of equal diameter. The reason for the dissimilar torsion rods 206 and 206a (or tubes 206') is to permit the generation of a wider range of differing levels of reaction force when one or the other of the torsion rods or tubes is twisted.

The axle assembly 198 further includes end portions or assemblies 210. Each end portion 210 includes a hollow body 212 having splined bore 214. The splined ends 208 and 208a of the torsion bar assembly 200 are received within a respective splined bore 214 of each end assembly 210. Each body 212 includes a narrow first portion 216 received within the through bore 40 for providing a bearing surface about which the spool 30 can rotate, a first shoulder 218 which is received within an annular groove 220 of the spool 30 which acts as a thrust bearing to absorb lateral loads and to laterally stabilize the spool 30. Each end assembly 210 further includes a second portion 222 which is received within respective opening 28a and 28b in the retractor frame 22. Each opening operates as a bearing to rotationally support the axle assembly 198. If desired a separate bearing can be inserted in the openings. Positioned adjacent the second portion of each end assembly 210 is a third portion 230 upon which is received a respective lock wheel 56 having lock teeth 58. The lock wheels can be positioned upon the second portion 222 in which case the third portion of each end assembly 210 is received within the frame openings 28a,b such that the lock wheels are positioned in-board of the frame sides 24a,b between the sides and the flanges of the spool. Each end assembly 210 further includes a ratchet wheel 74 or 74a having teeth 76 (and 76a). The ratchet wheels can be formed as an integral part of each end assembly or attached thereto.

As will become apparent from the description below the retractor 20 includes two independently activated energy absorbing mechanisms which in this present invention are formed by the two torsion rods 206 and 206a, the end assemblies 210 and associated locking mechanisms. These energy-absorbing mechanisms will permit the spool 30 to rotate relative to the axle assembly 198 when the seat belt is loaded by the occupant during an accident. The energy absorbing mechanisms will each generate a reaction force controllably impeding the rotation of the spool and the protraction of the seat belt. The energy absorbing mechanisms, as described below, will permit the generation of two different levels of controlled reaction force if activated independently and a third level of reaction force if activated simultaneously.

Figure 1:
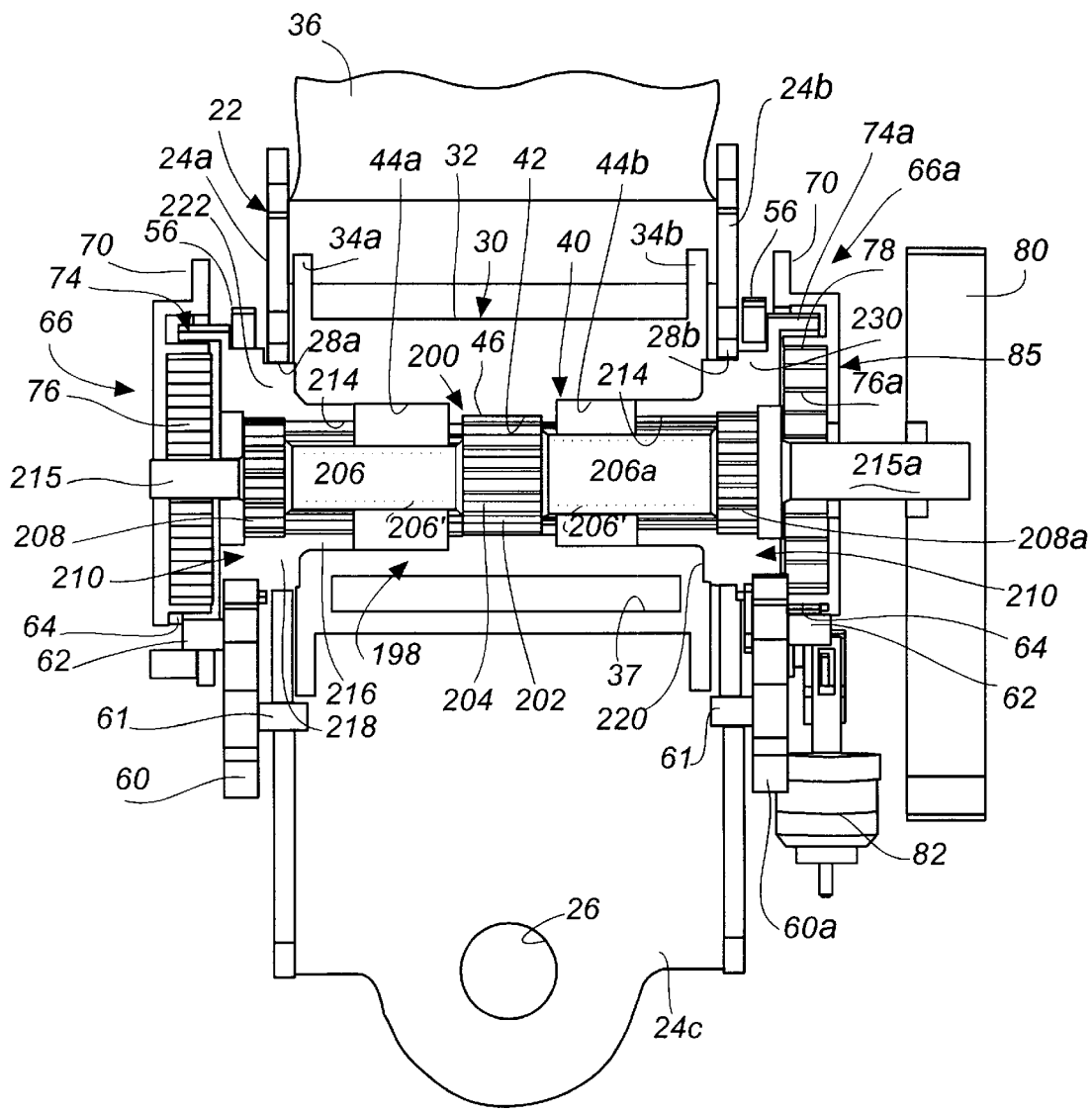
FIG. 1 is a front plan view of the present invention.

The lock teeth 58 of each lock wheel 56 are engaged by rotationally mounted lock pawls 60 (and 60a) (see FIGS. 1, 3 and 4) pivotably supported on pins 61 on opposing sides of the frame 22. Each lock pawl 60 and 60a includes an extending pin 62 which is received within a cam surface 64 of a respective lock cup 66 or 66a located on opposite sides of the retractor frame. The lock pawls 60 and 60a include a toothed portion or tip 61 engageable with the teeth 58 of its corresponding lock wheel 56. One such lock cup is shown in European Patent Application EP 0 228 729 A1 which is incorporated herein by reference. As is known in the art, retractors include a web sensor (to initiate lockup of the retractor when the webbing is protracted at a determinable level) and a vehicle sensor. Such a web sensor 85 is included within the lock cup 66a. Each lock cup 66 or 66a includes a plate 70.

Returning to the figures, in the present case, the torsion bar assembly 200 includes an extending stub axle 215 which extends from the splined portion 208 of the torsion bar assembly 200. Lock cup 66 is loosely secured about the stub axle 215. Extending from the other end of the torsion bar assembly 200 is a second stub axle 215a which acts as a spring arbor to receive an end of a return spring 80 which is used to rewind the seat belt 32 upon the spool 30. Lock cup 66 is loosely secured about stub axle 215.

As mentioned above, each splined portion 208 and 208a of the torsion bar assembly 200 is received within a corresponding splined portion 214 of the end assemblies 210. This construction rotationally fixes each splined portion to its end assembly 210. Additionally, by virtue of this connection, the stub axles 215 and 215a rotate with the respective end assemblies 210 and their ratchet wheels 74 and 74a. The lock cup 66a (attached to frame side 24b) includes a web sensor 85 (which may not be the case for lock cup 66) comprising an inertial mass which is located within the lock cup, which moves to engage internal teeth 78 of the ratchet wheel or lock cup when the seat belt webbing is protracted at a rate greater than a predetermined level, thereby linking the plate 70 of latch cup 66a with the ratchet wheel 74a and axle 215a, causing the lock cup 66a to rotate, thereby moving the lock pawl 60a into engagement with its mating lock teeth 58. As mentioned above, such a construction is generally known in the art.

Figure 3:
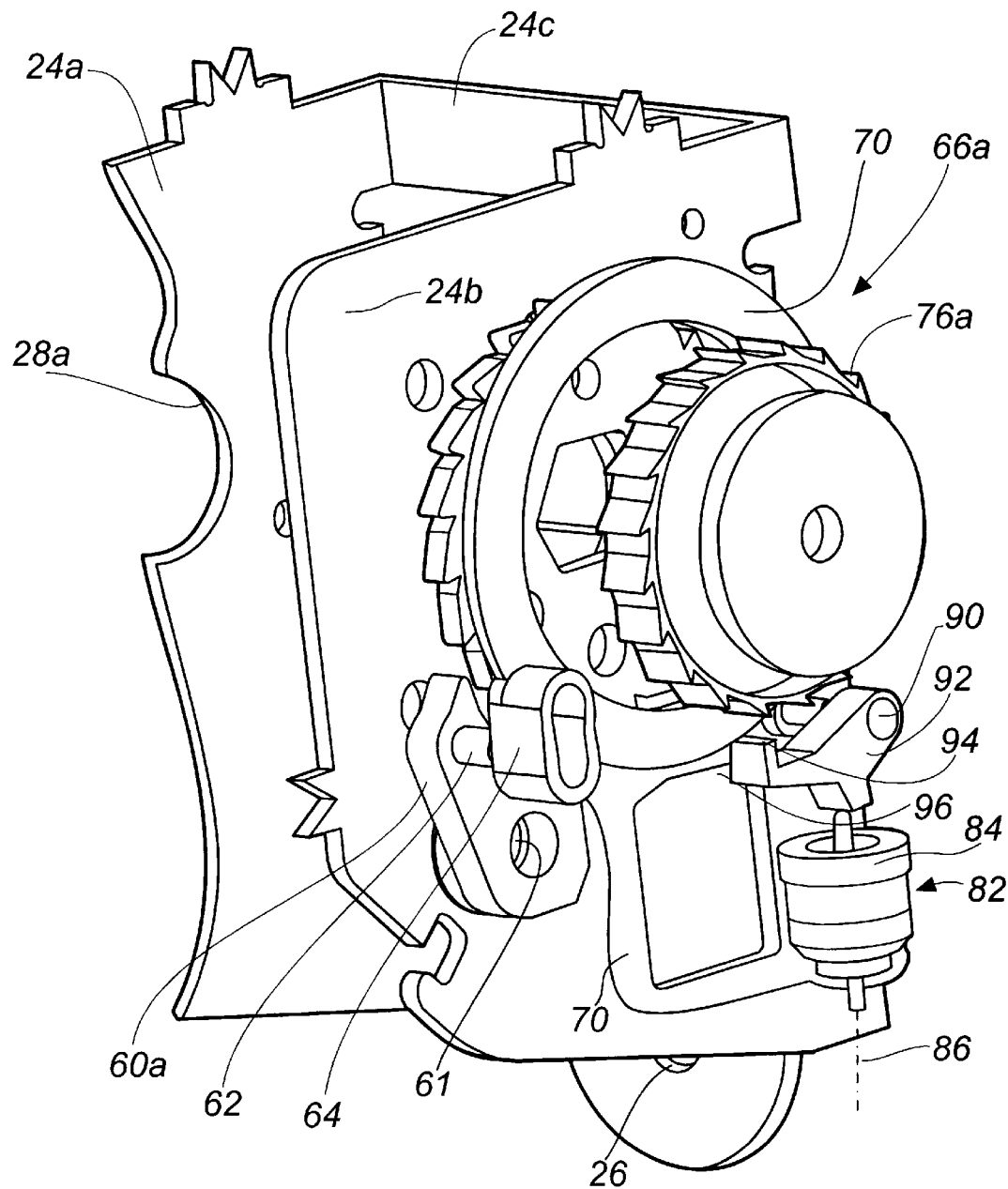
FIG. 3 is a right-side isometric view illustrating a lock cup and associated vehicle sensor.
Figure 4:
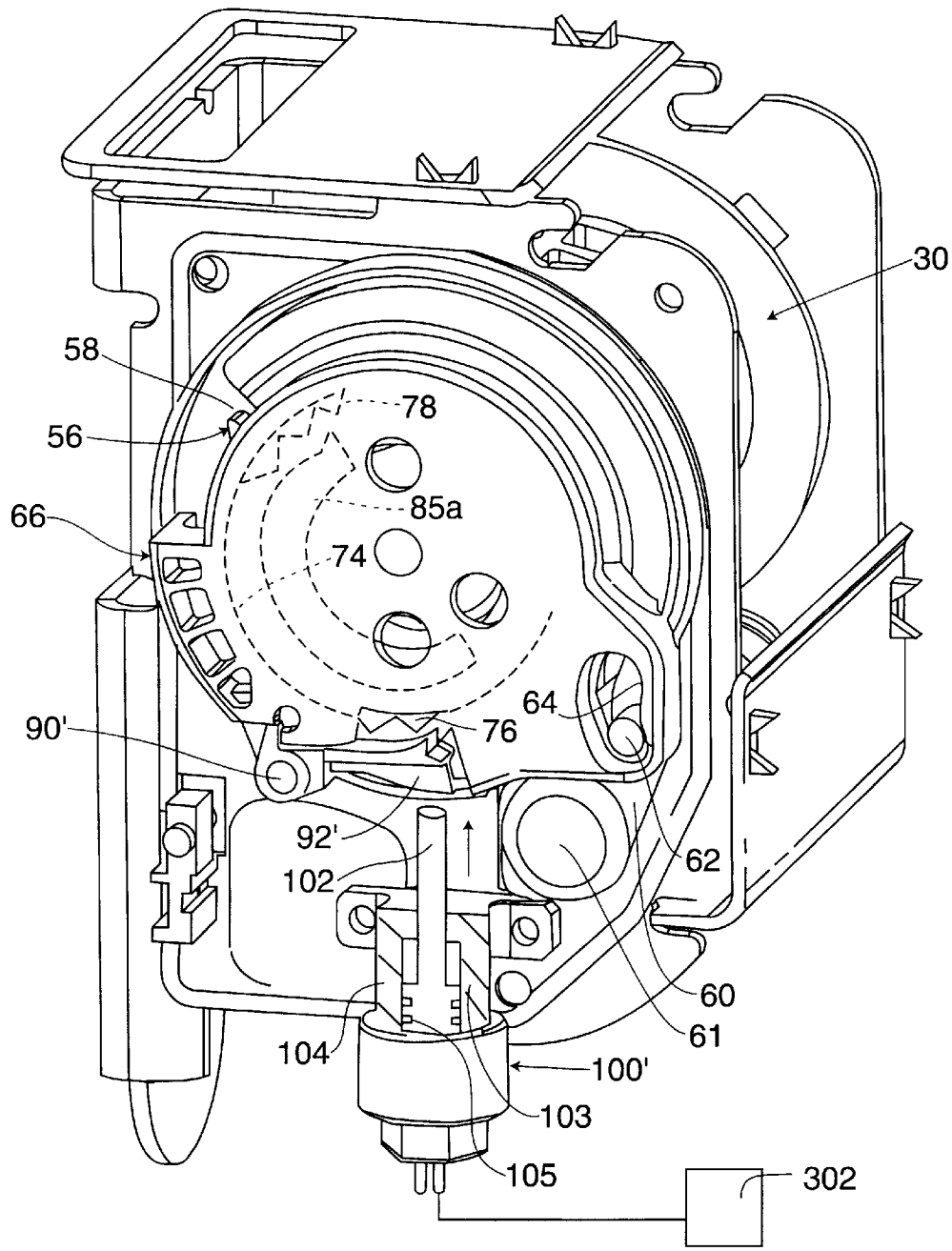
FIG. 4 is a left-side isometric view of a retractor illustrating a pyrotechnically initiated locking mechanism.

Reference is made to FIG. 3, which shows a vehicle (inertia) sensor generally shown as 82 which is associated only with lock cup 66a. The various parts of the lock cup are slightly separated for ease of illustration. In the illustrated embodiment this vehicle sensor is a standing man sensor having an inertial element 84 which tips relative to a center axis 86 when the vehicle decelerates greater than a predetermined level. The vehicle sensor 82 is situated upon, movable with and is supported on plate 70 of the lock cup 66a. Also pivotably mounted to the plate 70 of the lock cup 66a about pin 90 is a sensor pawl generally shown as 92. The sensor pawl includes a toothed portion 94 which is moved into engagement with the ratchet wheel teeth 76a and an extending arm 96. Typically the web sensor will be activated when the webbing is pulled or protracted from the retractor at a level exceeding 1.5 g's and the vehicle sensor activated when the vehicle is decelerating at a rate in excess of 0.45–0.7 g's. During normal operation of the vehicle involving a relatively high level of vehicle deceleration (which might occur in an accident or as a result of severe brake application), the inertial sensor will tip which in turn causes the sensor pawl 92 to rotate about its pivot 90 moving its toothed portion 94 into mating engagement with the teeth 76a on the ratchet wheel 74a. This coupling links the lock cup 62a to the axle, causing the lock cup 66a to rotate and to move the lock pawl 60a into engagement with the lock wheel, preventing protraction of the seat belt webbing from the spool 30.

Lock cup 66 (see FIG. 4), located on side 24a of the frame, supports a supplementary pyrotechnic actuator 100 having a plunger 102 that pushes upon a sensor pawl 92' that is pivoted about a pin 90 associated with the plate 70 of the lock cup 66. Upon activation of pyrotechnic actuator, the sensor pawl 92' is moved upwardly into engagement with the teeth 76, coupling the lock cup 66 to the motion of the axle assembly 198, thereby moving pawl 60 into engagement with its corresponding lock wheel 56. Lock cup 66 may optionally include a second web sensor having a sensitivity to cause the lock cup 66 to be activated at a level higher than that used to activate lock cup 66a. In this manner the retractor will be provided with a degree of redundancy. For example the web sensor 85, of known construction, associated with the primary mechanical locking mechanism 82 and lock cup 66a will typically be activated if the webbing is pulled from the retractor at levels in excess of 1.5 g. The web sensor 85a, of known construction, associated with lock cup 66 would be set at a higher lever such that if the first web sensor 85 did not activate at its level, this secondary web sensor would be available to lock the spool.

Returning to the pyrotechnic actuator 100, its plunger 102 is connected to a piston 103 which is movable within a housing 104. An O-ring seal 105 is provided to prevent the escape of products of combustion, produced upon activation of the actuator 100 beyond the piston and also captures gasses within the housing to maintain a positive pressure on the piston until after the crash event has terminated (a matter of milli-seconds). It is desirable that upon activation of the pyrotechnic actuator 100, the plunger 102 is maintained in engagement with the sensor pawl 92', at least during the entire crash event. This can be achieved by ensuring that the actuator 100 captures the products of combustion (pressurized gases) until the crash event is completed. It has been demonstrated that a properly designed seal 105 can maintain pressurization for a matter of minutes. Alternatively the lower end of the piston can be fabricated with an extending flange which becomes press fit within the housing 104 to mechanically prevent the plunger/piston from moving downwardly (from its upward activated position) away from pawl 92'.

The following illustrates the operation of the present invention. During the normal operation of the retractor, the webbing can be protracted as the occupant moves forward and retracted by the rewind spring as the occupant returns to the normal seated position. As mentioned above, the retractor includes a mechanical locking mechanism comprising a web sensor and a mechanical vehicle sensor 82. During the normal operation of the vehicle, there may be non-accident instances where the webbing is pulled out at a rate which will activate the web sensor, or the vehicle is decelerated at a level which would activate the mechanical vehicle sensor 82 thereby bringing the associated locking pawl 60a into locking engagement with its lock wheel, thereby halting the protraction of the seat belt webbing.

There will be instances, however, where the vehicle is involved in a crash. Such a crash, as sensed by an appropriate crash sensor (not shown), will typically involve deceleration levels that are greater than that which would be achieved during normal operation of the vehicle.

On the occurrence of a crash of a first level or magnitude, the mechanical inertia sensor assembly 82 or webbing velocity sensor 85 will be actuated such that the sensor pawl 92 is lifted into engagement with the lock teeth, thereby coupling the lock cup 66a to the retractor axle and causing the lock pawl 60a to move into engagement with the lock wheel, thereby momentarily locking the spool and prohibiting the protraction of the seat belt. During the crash, the occupant will typically move forwardly, loading the seat belt. These forces are transmitted directly to the webbing 36 and to the spool 30. As these forces or torque increase, the spool 30, through its splined connection to the torsion bar assembly 200 will rotate as torsion rod 206a twists. It should be appreciated that the splined end 208a of the torsion rod 206a will not rotate after its corresponding lock wheel 56 is locked. As the crash forces increase the spool 30 will be rotated in a direction of seat belt protraction and simultaneously be resisted by the reaction forces generated by torsion rod 206a as it continues to twist. In this manner, during a crash of a first level or magnitude, the manner in which seat belt is permitted to protract, the occupant's controlled forward motion and the forces input to the occupant via the seat belt are controlled. The magnitude of generated reaction force will depend upon the mechanical properties of the torsion bar 206a.

If the ECU 302 determines that the vehicle is involved in a crash of a greater second level, the ECU will generate a control signal to activate the pyrotechnic actuator 100 which is situated relative to frame side 24a. Upon activation of the pyrotechnic actuator, the sensor pawl 92' is moved upwardly into engagement with the ratchet wheel's teeth 76 (and preferably maintained in this condition), coupling the lock cup 66 to the motion of the corresponding end assembly 210, thereby moving pawl 60 into engagement with its corresponding lock wheel 56 locking the end assembly 210 of the axle assembly (and the splined end 208 of the torsion rod assembly 200). As mentioned above, torsion bars (or rods) 206 and 206a can be the same or of different diameters (or thickness). In the preferred embodiment torsion bar 206a is thicker than 206 however, the reverse condition can be used.

In the present invention, the mechanically activated web and vehicle sensing mechanisms located on the right hand side of the retractor provide the primary degree of control of the occupant. These sensing mechanisms will always be activated at a first level of a crash and of course will also be activated at a more severe crash level. The degree or level of reaction force generated by the retractor is governed by the mechanical characteristics of the torsion bar 206a which can be selected at a low or higher level depending on the size of the torsion bar chosen in concert with the known crash characteristics of the vehicle in which the retractor 20 is to be used. Supplemental occupant protection is achieved by a secondary mechanism which is activated during a crash of increased intensity. The exact level of crash severity during which the secondary activation mechanism is activated will also depend upon, for example, the vehicle's crash characteristics. In the case of the pyrotechnic actuator 100, the ECU 302, in conjunction with vehicle crash sensors located in and about the vehicle, will be activated at a crash level in excess of about 10–20 g's. It should also be appreciated that since actuator 100 is electrically actuated, the ECU 302 can be set to actuate the pyrotechnic actuator 100 at the same crash level (or slightly above this level) which would activate the mechanical sensing mechanism 82 thereby providing the capability of generating an increased initial reaction force using the combined potential of both torsion bars relatively simultaneously.

Figure 5:
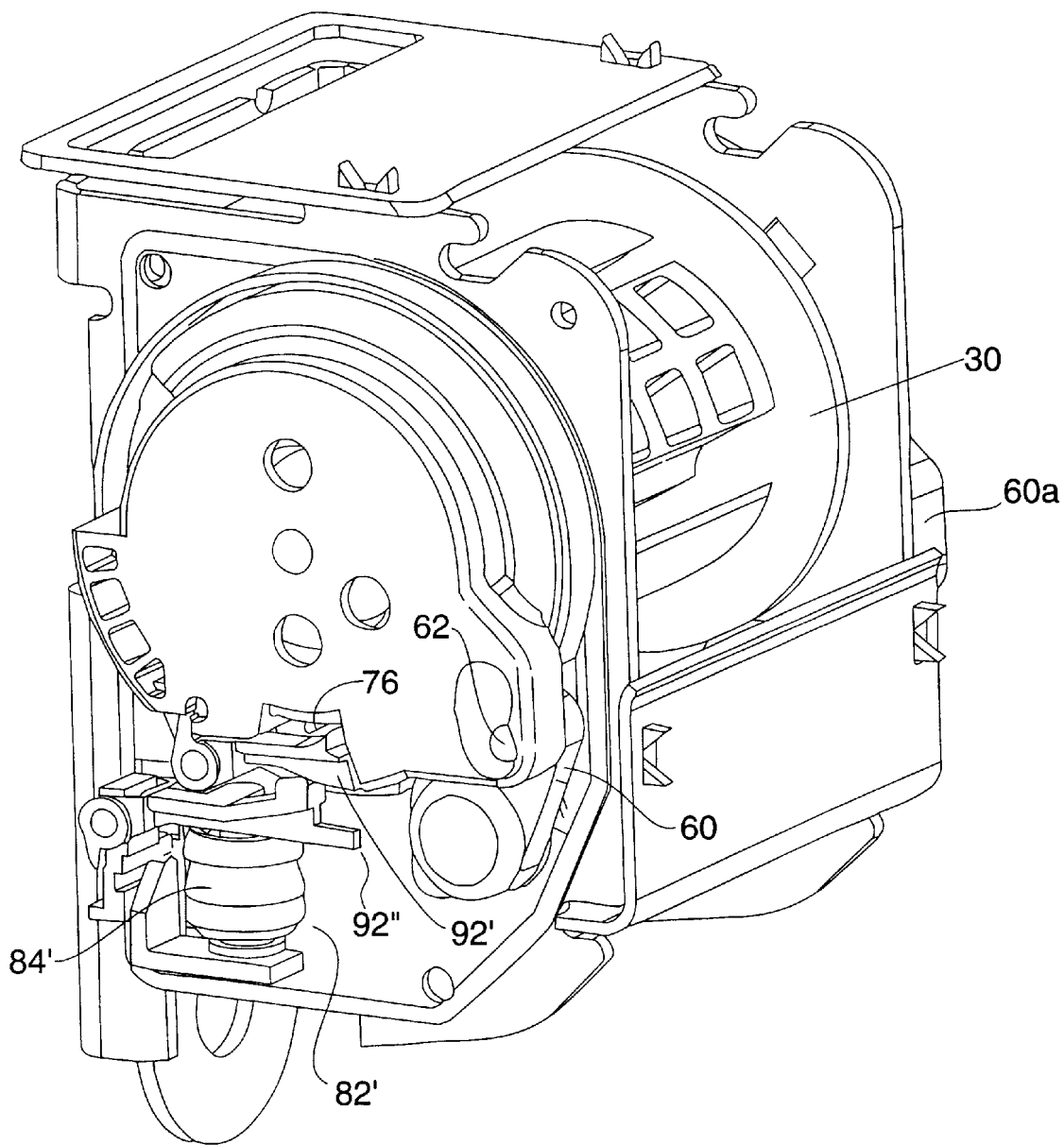
FIG. 5 is a left-side isometric view of a retractor illustrating a mechanical supplemental vehicle sensor to initiate lockup.

Reference is briefly made to FIG. 5 which illustrates an alternative secondary activation mechanism. In this embodiment of the invention the pyrotechnic actuator 100 has been replaced with a second mechanical vehicle sensor 82'. An optional secondary web 85a (web velocity) sensor may also be used. This mechanical vehicle sensor 82' is designed, in a known manner, to only be activated at crash levels of increased intensity above the first level including levels such as between 10–20 g's (as is the case for the pyrotechnic actuator 100). The mechanical vehicle sensor 82' is of similar design to sensor 82 but uses a compound pawl activation scheme. Movement of sensing mass 84' (such as the illustrated standing man or alternatively a rolling ball) moves the pivoted lower sensor pawl 92'' upwardly which in turn moves pawl 92', pivotably mounted upon the frame or a housing component, into engagement with the teeth 76 of the ratchet wheel 74.

In summary, it can be seen that the present retractor can generate a multi-level retarding force by activating one or the other of the energy dissipating members of the present invention. It should also be appreciated that by virtue of the incorporation in the present invention of the inertial mass sensor 82, which acts upon and moves the sensor pawl 92, that the present invention provides a high degree redundancy in its operation in that if for some reason the ECU 302 could not or does not generate the appropriate activation signals to the pyrotechnic actuator, the inertial sensor 82 will have moved the sensor pawl 92 into locking readiness with the ratchet wheel 74a, which in turn causes lock pawl 60a to move into engagement with its corresponding lock wheel.

As can be appreciated from the above, the level of control force generated by the energy absorbing mechanisms to oppose the rotation of the spool 30 and permit the controlled protraction of the seat belt will vary with the size of individual torsion rods 206 and 206a. Further, it may be desirable to size the torsion rod associated with the mechanical inertia sensor to generate a level of control force associated with a moderate or high level crash as the inertia sensor provides for primary occupant protection and to size the other (pyrotechnically or mechanically actuated supplemental mechanism associated with torsion rod 206) to generate a lower control force or reaction torque.

Many changes and modifications in the above-described embodiment of the invention can, of course, be carried out without departing from the scope thereof. Accordingly, that scope is intended to be limited only by the scope of the appended claims.

We claim:

1. An energy absorbing retractor (20) having
a spool,
torsion means (200, 206, 206a) for generating selected levels of reaction torque on the spool permitting the spool to rotate in a controlled manner in a belt protracting direction including a middle portion (202) and a first torsion member (206a) extending therefrom, the middle portion fixedly coupled to the spool to prevent relative rotation therebetween, a frame (22), wherein the spool is rotationally supported relative to the frame, a locking mechanism (60, 60a, 56, 66, 66a) comprising a primary mechanical first locking mechanism (66a, 58) adapted to initially stop the spool (30) from rotating in a belt protraction direction, said torsion means permitting the spool to rotate thereafter in the direction of belt protraction, a seat belt (36) wound about the spool, and bias means (80) to retract the seat belt onto the spool, the first torsion member including a first end (208a) operatively coupled to the primary mechanical first locking mechanism (66a, 58), the first locking mechanism when in a locked condition prevents the first end from rotating, whereby when the spool is loaded, the first torsion member (206a) twists and deforms torsionally to generate a controlled, reaction force having a first level, wherein the torsion means includes a second torsion member (206) extending from the middle portion opposite to the first torsion member (206a), the second torsion member including a second end (208) operatively coupled to a second locking mechanism (66, 58) to prevent the second end from rotating when the second locking mechanism is in a locked condition, whereby when the spool is loaded, the second torsion member twists and deforms torsionally to generate a controlled reaction force which supplements the first level of reaction force and wherein the second locking mechanism includes a pawl movable into a locking relationship with a toothed wheel and wherein the pawl is moved by a pyrotechnically activated mechanism.

2. The apparatus as defined in claim 1 wherein the second locking mechanism includes a seat belt velocity sensor designed to respond to a seat belt velocity payout (web protraction) greater than levels needed for seat belt durability and reliability requirements for initiating the locking up of a corresponding end of the torsion bar assembly.

3. The device as defined in claim 1 wherein the retractor includes control means (202) for locking the first and second ends of the first and second torsion members, respectively, relatively simultaneously.

4. The retractor as defined in claim 1 wherein the second locking mechanism further includes a web sensor which when activated by movement of the seat belt causes the second locking mechanism to lock.

5. The retractor as defined in claim 1 wherein the pyrotechnically activated mechanism includes first means for maintaining the pawl in an activated state through a crash event.

6. The retractor as defined in claim 1 wherein the second locking mechanism includes a movable lock cup and a locking pawl, the locking pawl being moved into locking engagement with a lock wheel subsequent to the activation of the pyrotechnically activated mechanism.

7. An energy absorbing retractor (20) having a spool, torsion means (200, 206, 206a) for generating selected levels of reaction torque on the spool permitting the spool to rotate in a controlled manner in a belt protracting direction including a middle portion (202) and a first torsion member (206a) extending therefrom, the middle portion fixedly coupled to the spool to prevent relative rotation therebetween, a frame (22), wherein the spool is rotationally supported relative to the frame, a locking mechanism (60, 60a, 56, 66, 66a) comprising a primary mechanical first locking mechanism (66a, 58) adapted to initially stop the spool (30) from rotating in a belt protraction direction while permitting the spool and torsion means to rotate thereafter in the direction of belt protraction, the primary mechanical first locking mechanism including a mechanical vehicle sensor operable to initiate lockup of the primary mechanical first locking mechanism at a first level of vehicle deceleration;

a seat belt (36) wound about the spool, and bias means (80) to retract the seat belt, the first torsion member including a first end (208a) operatively coupled to the primary mechanical first locking mechanism (66a, 58), the first locking mechanism when in a locked condition prevents the first end from rotating, whereby when the spool is loaded, the first torsion member (206a) twists and deforms torsionally to generate a controlled, reaction force having a first level, wherein the torsion means includes a second torsion member (206) extending from the middle portion opposite to the first torsion member (206a), the second torsion member including a second end (208) operatively coupled to a second locking mechanism (66, 58) to prevent the second end from rotating when the second locking mechanism is in a locked condition, whereby when the spool is loaded, the second torsion member twists and deforms torsionally to generate a controlled reaction force which supplements the first level of reaction force and wherein the second locking mechanism includes a mechanical inertial sensor for initiating the lockup of the second locking mechanism at a level of vehicle deceleration greater than or equal to the first level of deceleration.

8. The apparatus as defined in claim 7 wherein one of the first and second torsion members when twisted generates a low level of reaction force and the other one of the first and second torsion members when twisted generates a higher level of reaction force.

9. The device as defined in claim 7 wherein the first and second levels are different from each other.

10. The apparatus as defined in claim 7 wherein the first and second torsion members are torsion rods.

11. The apparatus as defined in claim 7 wherein the first and second torsion members are torsion tubes.

12. The device as defined in claim 7 wherein the level of vehicle deceleration associated with the second locking mechanism is in the range of 10 to 20 g's.

* * * * *